United States Patent
Tanabe et al.

(10) Patent No.: US 6,807,072 B2
(45) Date of Patent: Oct. 19, 2004

(54) ELECTRIC POWER CONVERSION DEVICE WITH PUSH-PULL CIRCUITRY

(75) Inventors: Katsutaka Tanabe, Okayama (JP); Nobuyuki Toyoura, Okayama (JP); Seiji Oka, Okayama (JP); Masao Mabuchi, Okayama (JP); Kotaro Nakamura, Okayama (JP); Yuji Tsurukawa, Kumamoto (JP); Kenichi Inoue, Okayama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/452,921

(22) Filed: Jun. 3, 2003

(65) Prior Publication Data

US 2004/0027842 A1 Feb. 12, 2004

(30) Foreign Application Priority Data

Jun. 5, 2002 (JP) .................................. P2002-164689

(51) Int. Cl.[7] .......................... H02M 3/335; H02H 7/122
(52) U.S. Cl. ........................ 363/25; 363/56.06; 363/133
(58) Field of Search .......................... 363/24, 25, 56.06, 363/56.07, 56.08, 95, 97, 131, 133

(56) References Cited

U.S. PATENT DOCUMENTS

| 4,424,556 A | * | 1/1984 | Maeda et al. ................. 363/17 |
| 4,429,365 A | * | 1/1984 | Luckman et al. ........... 701/111 |
| 4,477,867 A | * | 10/1984 | Pellegrino .................... 363/26 |
| 4,642,749 A | * | 2/1987 | Walker ..................... 363/56.06 |
| 4,937,470 A | * | 6/1990 | Zeiler .......................... 327/109 |
| 5,495,405 A | * | 2/1996 | Fujimura et al. ........... 363/133 |
| 6,639,814 B2 | * | 10/2003 | Gan et al. ..................... 363/25 |

* cited by examiner

*Primary Examiner*—Adolf Berhane
(74) *Attorney, Agent, or Firm*—Foley & Lardner LLP

(57) ABSTRACT

An electric power conversion device comprises switching elements 2*a*, 2*b* making up a push-pull converter, a pulse transformer T, a rectification diode D1, a rectification diode D2, a choke coil L, a smoothing capacitor C, a DC magnetic deviation prevention means 3, and an inverter 4. The DC magnetic deviation prevention means 3 detects the coil currents I1, I2 flowing in the primary windings M1, M2 of the pulse transformer T. By controlling (shortening) the on time of the switching element having a greater amount of current, the coil currents I1, I2 are balanced (I1=I2), thereby preventing the magnetic deviation phenomena of the pulse transformer T.

5 Claims, 3 Drawing Sheets

ELECTRIC POWER CONVERSION DEVICE WITH PUSH-PULL CIRCUITRY

BACKGROUND OF THE INVENTION

1. Field of the Invention

The present invention relates to an electric power conversion device with push-pull circuitry, in which a DC power supply such as a solar cell or a fuel cell is switched on/off to generate high-frequency pulses which are rectified and smoothed through a pulse transformer thereby to generate a direct current, or in particular an electric conversion device with push-pull circuitry for preventing the magnetic deviation phenomena of the pulse transformer due to an unbalanced current of the push-pull circuit.

2. Description of the Related Art

In recent years, what is called the parallel operation system with mains has been provided, in which DC power obtained from a solar cell or a fuel cell is converted into AC power as a distributed power generation unit, and power is supplied to domestic appliances (loads) using the distributed power generation unit in collaboration with the commercial power supply, so that in the case where the power demand cannot be met by the distributed power generation unit, power is supplied from the commercial power supply.

In this parallel operation system with mains, a power conditioner is used for outputting by converting the DC output power of the solar cell or the fuel cell to the AC current or power synchronous with the system to make possible parallel connection with the commercial power supply or the like AC power supply. This power conditioner is configured of a power conversion device for converting the DC power to the AC power synchronous with the commercial power supply (say, AC 200 V) and a protective device for detecting a fault of the commercial power supply.

Also, the power conversion device generates high-frequency pulses from the direct current of the solar cell or the fuel cell through a switching element such as an FET (field effect transistor), applies the high-frequency pulses thus generated to the primary side of the pulse transformer, and rectifies and smoothes the high-frequency pulses obtained from the secondary side of the pulse transformer, thereby generating the DC current again, which is converted to an AC power supply through an inverter.

The electric power conversion device also comprises a DC—DC converter for turning on/off two switching elements alternately thereby to convert the DC current into high-frequency pulses, which are applied to the two windings on the primary side of the pulse transformer, and rectifying and smoothing the high-frequency pulses of opposite polarities obtained from the two secondary windings of the pulse transformer thereby to generate a DC current. This DC power is converted to the AC power synchronized (say, at 50 Hz) with the commercial power supply through an inverter.

The conventional electric power conversion device of this type is known to include a DC—DC converter with push-pull circuitry configured of two switching elements and a pulse transformer. The electric power conversion device with push-pull circuitry has the advantage that the circuit can be reduced in size with a higher power conversion efficiency.

With the conventional power conversion device with push-pull circuitry, in the case where the switching elements making up the push-pull circuit have different on time or in the case where the values of the positive and negative current undergo a change due to a load variation, the problem of magnetic deviation phenomena is posed in which the magnetic flux density of the iron core of the pulse transformer is deviated to the winding having a longer on time or having a larger current value. Thus, the deviation of the magnetic flux density is increased for each switching period, and finally saturated by exceeding the maximum magnetic flux density of the iron core, with the result that the inductance of the winding having a longer switching on time or a larger current amount is reduced for a further increased coil current.

Several conventional power conversion devices with push-pull circuitry, which find applications for suppressing or preventing the magnetic deviation phenomena, harbor the problem that the circuit configuration and the structure of the pulse transformer are complicated. An example of the practical application is a method in which the transformer and the FET of the switching elements have a margin of capacity to prevent the damage due to an increased coil current caused by the magnetic deviation phenomena. This method, however, leads to an increased device size and an increased cost. Another practical example is a method in which a thermocouple is mounted on the transformer to detect the temperature rise due to the DC magnetic deviation. The problem of this method lies in the process of mounting by bonding or fixing the thermocouple on the transformer core. Also, the detection of a temperature rise is difficult before actual temperature rise, resulting in a low response of compensation for the DC magnetic deviation. Still another example of the conventional application is a method in which an increased primary current of the transformer due to the DC magnetic deviation is detected by a CT (current transformer). In this method, the primary current of the transformer is required to be constantly monitored by inserting the CT on the primary side of the transformer. This requires a high-speed current detection and a high-speed arithmetic operation, which in turn requires the provision of an expensive operational IC and I/F circuit.

SUMMARY OF THE INVENTION

This invention has been developed to solve the problems described above, and the object thereof is to provide a power conversion device with push-pull circuitry having a simple configuration for preventing the DC magnetic deviation of the pulse transformer.

In order to solve the aforementioned problems, according to one aspect of the invention, there is provided a power conversion device with push-pull circuitry comprising a DC magnetic deviation prevention means for detecting the coil current flowing in the two primary windings of a pulse transformer and balancing the coil current by adjusting the on time of two switching elements based on the coil current deviation, thereby preventing the DC magnetic deviation of the primary winding of the pulse transformer.

The power conversion device with push-pull circuitry according to this aspect of the invention comprises a DC magnetic deviation prevention means for detecting the coil current flowing in the two primary windings of a pulse transformer and balancing the coil current by adjusting the on time of two switching elements based on the coil current deviation, thereby preventing the DC magnetic deviation of the primary winding of the pulse transformer. Therefore, a switching element can be specified by the coil current deviation and the polarity (+ or −) of the coil current deviation, and the same coil current flowing in the two primary windings of the pulse transformer can be secured by determining the on time, thereby preventing the DC magnetic deviation of the pulse transformer with a simple configuration.

According to another aspect of the invention, there is provided a power conversion device with push-pull circuitry, comprising a magnetic prevention means including a current sensor for detecting the coil currents flowing in the two primary windings of a pulse transformer, an integration means for integrating the detected coil current for a predetermined period of time, a drive control means for outputting a drive control signal corresponding to the integration value accumulated by the integration means, and a drive means for outputting a drive signal for adjusting the on time of the two switching elements based on the drive control signal supplied from the drive control means.

The DC magnetic-deviation prevention means according to this aspect of the invention includes a current sensor for detecting the coil currents flowing in the two primary windings of a pulse transformer, an integration means for accumulating the detected coil current for a predetermined period of time, a drive control means for outputting a drive control signal corresponding to the integration value accumulated by the integration means, and a drive means for outputting a drive signal for adjusting the on time of the two switching elements based on the drive control signal supplied from the drive control means. Therefore, a switching element for supplying a greater amount of coil current is specified based on the detected coil current, and the coil currents flowing in the two primary windings of the pulse transformer can be balanced by adjusting the on time of the specified switching element, thereby making it possible to prevent the magnetic deviation phenomena of the pulse transformer which otherwise might be caused by the unbalanced coil currents.

According to still another aspect of the invention, there is provided an electric power conversion device in which the current sensor is configured of a CT (current transformer) and the coil currents flowing in the two primary windings of the pulse transformer are detected in reverse polarities.

With the current sensor making up a CT according to this invention, the coil currents flowing in the two windings on the primary side of the pulse transformer are detected in reverse polarities, and therefore the deviation of the coil currents flowing in the two windings can be detected with a single CT, thereby simplifying the device.

According to yet another aspect of the invention, there is provided an electric power conversion device, in which the drive control means determines a switching element for controlling the on time based on the polarity of the integration value accumulated by the integration means.

With the drive control means according to this aspect of the invention, the switching element for controlling the on time is determined based on the polarity of the integration value accumulated by the integration time, and therefore the on time of the switching element supplied with a greater amount of the coil current can be controlled, thereby making it possible to balance the coil currents flowing in the two primary windings of the pulse transformer.

According to a further aspect of the invention, there is provided an electric power conversion device, in which the DC power supply is a solar cell or a fuel cell.

In this aspect of the invention, the DC power supply is a solar cell or a fuel cell. Therefore, the DC power supply used as a distributed power generation unit for the domestic electric appliances can find wider applications, thereby making it possible to improve the utility of the electric power conversion device.

DESCRIPTION OF THE PREFERRED EMBODIMENTS

Figure 1:
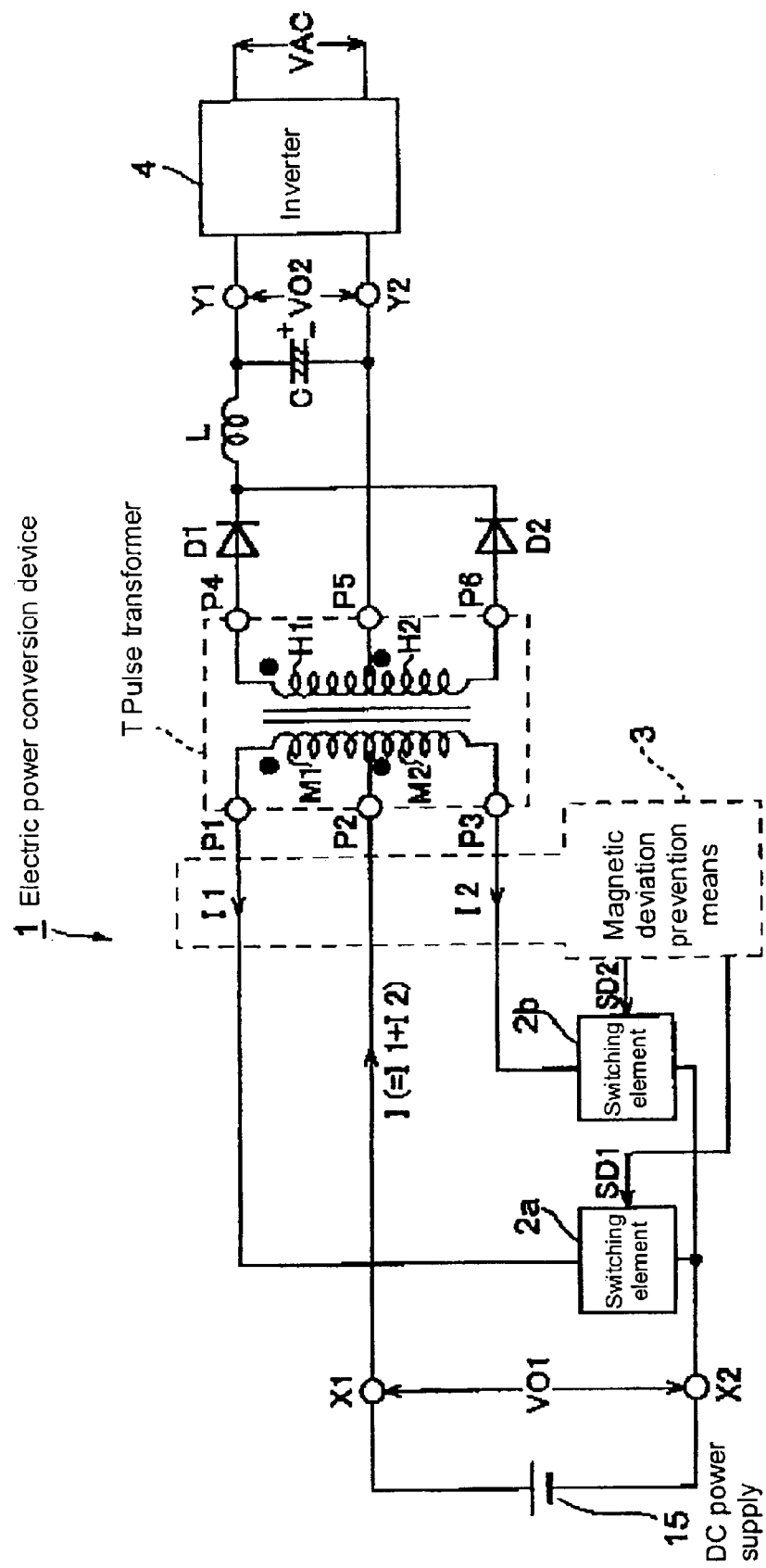
FIG. 1 is a block diagram showing a basic configuration of an electric power conversion device with push-pull circuitry according to this invention.

An embodiment of the invention will be described below with reference to the accompanying drawings. FIG. 1 is a diagram showing a basic configuration of an electric power conversion device with push-pull circuitry embodying the invention. In FIG. 1, an electric power conversion device 1 comprises a switching element 2a and a switching element 2b making up a push-pull converter, a pulse transformer T, a rectification diode D1, a rectification diode D2, a choke coil L, a smoothing capacitor C, a DC magnetic deviation prevention means 3 and an inverter 4. The DC voltage V01 of a DC power supply 15 such as a solar cell or a fuel cell is converted into high-frequency pulses and input to the primary side of a pulse transformer T, and the high-frequency pulses are retrieved from the secondary side isolated from the primary side of the transformer T and rectified and smoothed into a DC power (DC voltage V02), which in turn is converted into an AC power (say, 50 Hz/200 V) through an inverter 4.

The switching element 2a is configured of a MOSFET (metal oxide semiconductor field effect transistor) or the like. An end (drain, for example) of the switch is connected to the P1 terminal of the primary winding M1 of the pulse transformer T, while the other end (source, for example) of the switch is connected to a terminal X2 connected with the negative (minus) terminal of a DC-power supply 15 (DC voltage V01). Also, the control terminal (gate, for example) is supplied with a drive signal SD1 for controlling the on time of the switching element 2a from a DC magnetic deviation prevention means 3.

The switching element 2b is made up of a MOSFET or the like. One end (drain, for example) of the MOSFET forming a switch is connected to the terminal P3 of the primary winding M2 of the pulse transformer T, while the other terminal (source, for example) making up the switch is connected to the terminal X2 connected with the negative (minus) terminal of the DC power supply 15 (DC voltage V01). Also, the control terminal (gate, for example) is supplied with a drive signal SD2 for controlling the on time of the switching element 2a from the DC magnetic deviation prevention means 3.

The pulse transformer T is configured of two primary windings with a center tap, including a primary winding M1 and a primary winding M2. The primary winding M1 has a terminal P1 at one end thereof, and has a terminal P2 shared by the other end of the primary winding M1 and one end (center tap) of the primary winding M2, the other terminal of the primary winding M2 makes up a terminal P3.

The pulse transformer T is also configured of two secondary windings with a center tap, including a secondary winding H1 and a secondary winding H2. The secondary winding H1 has a terminal P4 at one end thereof, and a terminal P5 is shared by the other end of the secondary winding H1 and one end (center tap) of the secondary winding H2, the other end of which makes up a terminal P6.

The primary winding M1 and the primary winding M2 have the same number of turns, and so do the secondary winding H1 and the secondary winding H2.

The terminal P2 on the primary side of the pulse transformer T is connected to a terminal X1 on the positive (+) side of a DC power supply 15 (DC voltage V01), while the other terminal (source of FET, for example) forming the switch having the switching element 2a and the switching element 2b is connected to a terminal X2 on the negative (−) side of the DC power supply 15 (DC voltage V01). In the case where the switching element 2a is turned on/off repeatedly, therefore, a pulse-like coil current I1 flows through the route including the terminal X1, the terminal P2, the primary winding M1, the terminal P1, the switching element 2a and the terminal X2 in that order, thereby generating high-frequency pulses in the primary winding M1.

In the case where the switching element 2b is turned on/off repeatedly, on the other hand, a coil current I2 flows through the route including the terminal X1, the terminal P2, the primary winding M2, the terminal P3, the switching element 2b and the terminal X2 in that order, thereby generating high-frequency pulses in the primary winding M2.

Drive signals SD1, SD2 supplied from the DC magnetic deviation prevention means 3 to the switching element 2a and the switching element 2b are output at H level alternately at each time interval shorter than one-half (=0.01 ms) of the period (0.02 ms) of high frequency (say, 50 kHz). Thus, the switching element 2a is turned on and the coil current I1 flows while the drive signal SD1 is at H level, and the switching element 2b is turned on and the coil current I2 flows while the drive signal SD2 is at H level.

The terminal P4 on the secondary side of the pulse transformer T is connected to the anode of a rectification diode D1, the terminal P6 is connected to the anode of a rectification diode D2, the cathodes of the rectification diode D1 and the rectification diode D2 are connected to an end of the choke coil L, and the other end of the choke coil L is connected to the positive (+) terminal of a smoothing capacity C and the terminal Y1. On the other hand, the terminal P5 is connected to the negative (−) terminal of the smoothing terminal C and the terminal Y2.

In this configuration, the high-frequency pulse generated in the secondary winding H1 (between terminals P4 and P5) is rectified by the rectification diode D1 and then smoothed by the smoothing capacitor C through the choke coil L, thereby generating a direct current (DC voltage V02) between terminals Y1 and Y2.

On the other hand, the high-frequency pulses generated in the secondary winding H2 (between terminals P6 and P5) are rectified by the rectification diode D2 and then smoothed by the smoothing capacitor C through the choke coil L, thereby generating a direct current (DC voltage V02) between the terminals Y1 and Y2.

The direct current (DC voltage V02) generated between the terminals Y1 and Y2 is rectified by the rectification diodes D1 and D2, thereby generating a synthesized voltage smoothed by the smoothing capacitor C through the choke coil L.

The inverter 4 has the function of DC-AC conversion so that the direct current (DC voltage V02) generated between terminals Y1 and Y2 is converted to an AC power (say, 50 Hz/200 V), thereby interconnecting the AC power as a distributed power generation unit.

The DC magnetic deviation prevention means 3 has the processing functions of a hardware configuration or a software configuration or a mixed hardware/software configuration such as the current sensor, the current deviation calculation function, the drive control function and the drive signal generating function. The DC magnetic deviation prevention means 3 detects the coil current I1 flowing in the primary winding M1 and the coil current I2 flowing in the primary winding M2 of the pulse transformer T, and calculates the difference between the coil current I1 and the coil current I2, thereby determining whether the magnetic deviation has occurred in the primary winding M1 or the primary winding M2.

The determination as to the occurrence of the DC magnetic deviation is carried out based on the unbalance between the coil current I1 and the coil current I2. In the case where the coil current I1 exceeds the coil current I2 (I1<I2) and magnetic fluxes due to the primary winding M1 exceed the maximum flux density in a saturated situation, then the inductance is reduced and the coil current I1 increases, thereby determining that the magnetic deviation phenomena are generated.

Further, in the case where the coil current I2 exceeds the coil current I1 (I2>I1), on the other hand, the primary winding M2 is saturated exceeding the maximum magnetic flux density, so that the inductance is reduced for an increased coil current I2. Thus, it is determined that the magnetic deviation phenomena have occurred.

Further, in the case where the coil current I1 and the coil current I2 are equal to each other (I1–2), it is determined that neither the primary winding M1 nor the primary winding M2 has developed the magnetic deviation phenomena. Under normal condition, the characteristics (pair quality) of the switching elements 2a and 2b, the characteristics (number of turns, inductance, etc.) of the primary and secondary windings M1, M2 and the levels of the drive signals SD1, SD2 (the time of H level) coincide with each other, and therefore no magnetic deviation phenomena occur. In the initial state, on the other hand, the levels of the drive signals SD1 and SD2 (H-level period) are regulated not to generate any magnetic deviation phenomena in the primary winding M1 and the primary winding M2.

In the case where the coil current I1 exceeds the coil current I2 (I1<I2) and the magnetic deviation phenomena occur, on the other hand, the H-level period of the drive signal SD1 is shortened in accordance with the current difference ΔI (=I1−I2). Thus, the on time of the switching element 2a is shortened, and the coil current I1 is reduced to coincide with the coil current I2. By balancing the currents in this way, the magnetic deviation phenomena are prevented.

As described above, the on time of the switching elements (2a, 2b) is shortened basically by controlling the side on which the coil current (I1 or I2) flows in a greater amount.

In view of the fact that the period during which the coil current I1 flows is different from the period during which the coil current I2 flows (each for different periods less than one half period), the current difference ΔI (=I1−I2) between the coil current I1 and the coil current I2 is detected by detecting and adding, in reverse polarities, the difference of the average value between the coil current I1 and the coil current I2 for one period, or by detecting and adding the amounts (integration values, for example) corresponding to the coil current I1 and the coil current I2. The current difference ΔI (=I1−I2) may be an average value for a predetermined period.

The drive signals SD1 and SD2 are formed of a PWM (pulse width modulation) signal or a signal corresponding the PWM signal.

According to this embodiment, the magnetic deviation phenomena are detected from the current difference ΔI between the coil current I1 and the coil current I2, and the magnetic deviation phenomena are prevented by striking a balance between the coil current I1 and the coil current I2. As an alternative, the magnetic deviation phenomena may be prevented in such a manner that the magnetic deviation phenomena are detected by the electric energy on the primary and secondary sides of the pulse transformer T, or by detecting a sudden increase in the coil current on the primary side in a differentiation circuit as the operation of the magnetic deviation phenomena and balancing the coil current I1 and the coil current I2.

As described above, the power conversion device 1 according to this invention comprises DC magnetic deviation prevention means 3, in which the coil currents (I1, I2) flowing in the two primary windings (primary winding M1, primary winding M2) of the pulse transformer T are detected, and based on the coil current difference (αT), the on time of the two switching elements (2a, 2b) is adjusted to balance the coil currents (I1=I2), thereby preventing the DC magnetic deviation of the primary windings (primary windings M1, M2) of the pulse transformer T. Thus, a switching element is specified and the on time determined by the coil current difference and the polarity (+ or −) of the coil current difference, so that the same current amount can be secured between the coil currents (I1, I2) flowing in the two primary windings (primary winding M1 and the primary winding M2) of the pulse transformer T, thereby making it possible to prevent the DC magnetic deviation of the pulse transformer with a simple configuration.

Also, according to this invention, the DC power supply is derived from a solar cell or a fuel cell. Therefore, the DC power supply used as a distributed power generating unit for home electric appliances can find wider applications, resulting in an improved utility of the power conversion device.

Figure 2:
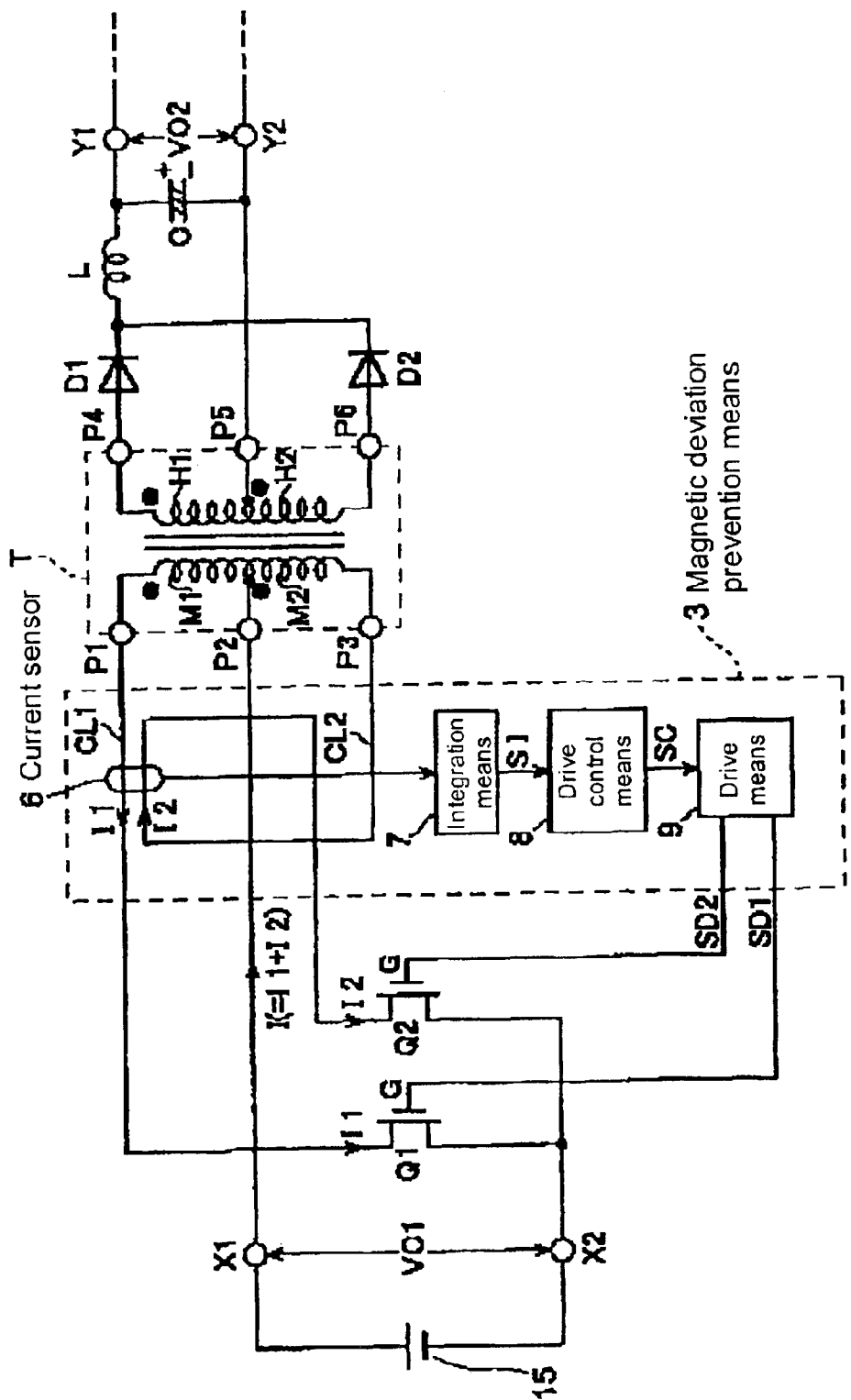
FIG. 2 is a block diagram showing a configuration of the essential parts of a DC magnetic deviation prevention means according to an embodiment of the invention.

FIG. 2 is a block diagram showing a configuration of the essential parts of the DC magnetic deviation prevention means according to an embodiment of the invention. In FIG. 2, an electric power conversion device 5 comprises a MOSFET-Q1 (MOSFET: metal oxide semiconductor field effect transistor) and MOSFET-Q2 making up a push-pull converter, a pulse transformer T, a rectification diode D1, a rectification diode D2, a choke coil L, a smoothing capacitor C, a DC magnetic deviation prevention means 3 and an inverter 4.

The electric power conversion device 5 is different from the electric power conversion device 1 only in that the switching elements 2a, 2b are MOSFET-Q1, MOSFET-Q2, respectively, and the DC magnetic deviation prevention means 3 includes a current sensor 6, an integration means 7, a drive control means 8 and a drive means 9. Therefore, an explanation will be omitted about the pulse transformer T, the rectification diode D1, the rectification diode D2, the choke coil L, the smoothing capacitor C and the inverter 4.

MOSFET-Q1 has the drain thereof connected to the terminal P1 of the primary winding M1 of the pulse transformer T, and the source thereof connected to the terminal X2 connected with the negative (−) terminal of the DC power supply 15 (DC voltage V01). When the drive signal SD1 for controlling the on period is applied to the gate G from the drive means 9 of the DC magnetic deviation prevention means 3, the pulse-like coil current I1 flows through the route including the terminal X1, the terminal P2, the primary winding M1, the terminal P1, the MOSFET-Q1 (between drain and source) and the terminal X2 in that order, and a high-frequency pulse is generated in the primary winding M1.

The MOSFET-Q2 has the drain thereof connected to the terminal P3 of the primary winding M2 of the pulse transformer T, and the source thereof connected to the terminal X2 which in turn is connected with the negative (−) terminal of the DC power supply 15 (DC voltage V01). When the drive signal SD2 for controlling the on period is supplied to the gate G from the drive means 9 of the DC magnetic deviation prevention means 3, the coil current I2 flows through the route including the terminal X1, the terminal P2, the primary winding M2, the terminal P3, the MOSFET-Q2 (between drain and source) and the terminal X2 in that order thereby to generate a high-frequency pulse in the primary winding M2.

Next, the DC magnetic deviation prevention means 3 will be explained. The current sensor 6 is configured of a current transformer for detecting, in reverse polarities (±), the coil current I1 flowing in the primary winding M1 and the coil current I2 flowing in the primary winding M2. For this reason, the directions of the wiring CL1 and the wiring CL2 passed through the current transformer are set in such a manner that the direction of the coil current I1 flowing in the wiring CL1 connected to the terminal P1 is reverse to the direction of the coil current I2 flowing in the wiring CL2 connected to the terminal P3.

By returning the wiring CL2 connected to the terminal P3 and passing it through the current transformer, for example, for example, the coil current I1 flowing in the wiring CL1 connected to the terminal P1 and the coil current I2 can be set in opposite polarities. Under this condition, the coil current I2 can be detected as negative (−) by setting the coil current I1 at positive (+)

Figure 3:
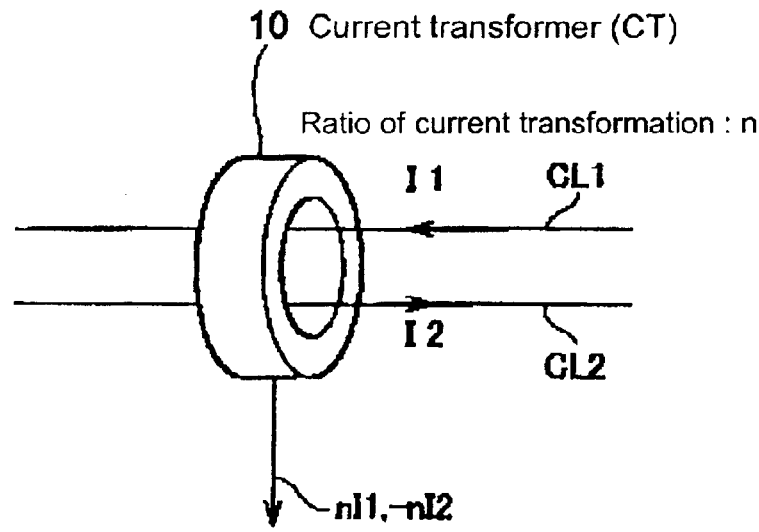
FIG. 3 is a diagram showing a configuration of a current sensor according to an embodiment of the invention.

FIG. 3 is a diagram showing a configuration of the current sensor according to an embodiment of the invention. In FIG. 3, the current sensor is configured of a current transformer (CT) 10. The wiring CL1 connected to the terminal P1 of the primary winding M1 of the pulse transformer T and the wiring CL2 connected to the terminal P3 of the primary winding M2 of the pulse transformer T are passed through the current transformer (CT) 10.

In the case where the coil current I1 flowing in the wiring CL1 is set at positive (+), the coil current I2 flowing in the wiring CL2 (in the reverse direction to the coil current I1) is set at negative (−). Thus, the detection currents nI1, −nI2 determined by the ratio of current transformation of the current transformer (CT) 10 can be retrieved.

Figure 4A:
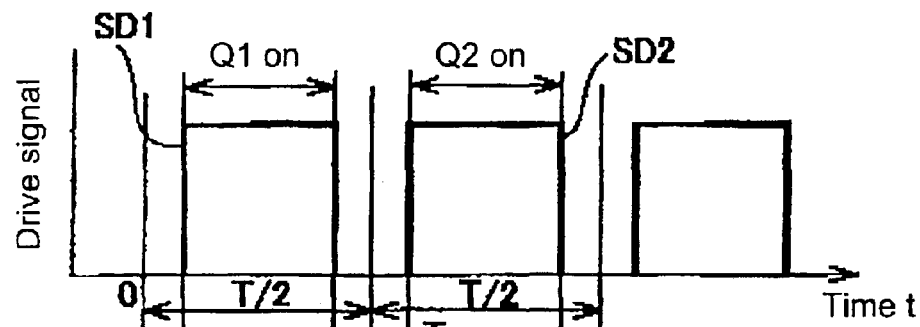
FIGS. 4A and 4B are diagrams for explaining the relation between the drive signal and the detected current according to the invention.
Figure 4B:
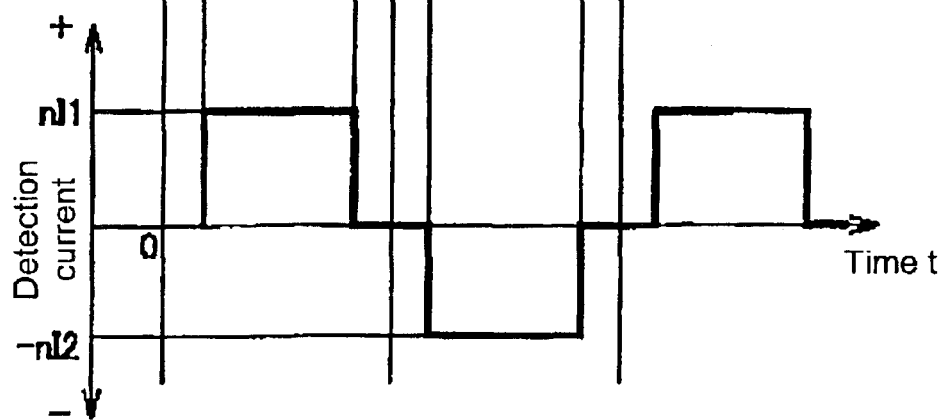

FIG. 4 is a diagram showing the relation between the drive signal and the detection current according to this invention. FIG. 4A shows a waveform of the drive signal, and FIG. 4B a waveform of the detection current. The drive signal SD1 and the drive signal SD2 shown in FIG. 4A are output as H-level turn-on signals (Q1 on, Q2 on) shorter than one half (T/2) of one period T.

The detection current shown in FIG. 4B is output as a detection current nI1 of positive (+) polarity of the coil current I1 for a period corresponding to the H-level turn-on signal (Q1 on), and during the following period corresponding to the H-level turn-on signal (Q2 on), it is output as a detection current −nI2 of negative polarity (−).

The current transformer (CT) 10 can detect the coil current I1 and the coil current I2 in opposite polarities (±) using a single sensor. Thus, the current difference ΔI (=I1−I2) between the coil current I1 and the coil current I2 can be easily determined.

As described above, the current sensor 6 according to the invention is configured of a CT (current transformer) 10, and can detect, in opposite polarities (±), the coil currents I1, I2 flowing in the two windings (primary winding M1, primary winding M2) on the primary side of the pulse transformer T. Therefore, the difference ΔI (=I1−I2) between the coil currents flowing in the two windings can be detected by a single CT, thereby simplifying the device. .Returning to FIG. 2, the integration means 7 is configured of an integration circuit including a resistor R and a capacitor C. The detection currents nI1, −nI2 for one period detected by the current transformer (CT) 10 are converted into a voltage by the resistor, and the positive (+) pulses voltage-converted from the detection current nI1 are integrated to produce a positive (+) integrated value SI+. After that, the detection current −nI2 is converted into a voltage as a negative (−) pulse, thereby producing a negative (−) integrated valve SI−.

The integration means 7 includes an adder for adding the positive (+) integration value SI+ and the negative (−) integration value SI− and supplies an integration signal SI (=SI++SI−) for one period T to the drive control means 8.

The drive control means 8, which is configured of a data table of a PWM (pulse width modulation) increment/decrement signal for the integration signal SI and a PWM signal generator, generates a PWM increment/decrement signal corresponding to the integration signal SI supplied from the integration means 7, and supplies a drive control signal (PWM) signal corresponding to the PWM increment/decrement signal to the drive means 9. The drive control signal (PWM signal) SC is set to determine the MOSFET-Q1 (or Q2) in such a manner as to control the coil current (I1 or I2) associated with a larger absolute value of the integration signal. By thus controlling the on time, the coil current I1 and the coil current I2 are set to become equal to each other in a balanced state.

As described above, the drive control means 8 according to the invention determines the switching element (MOSFET-Q1 or MOSFET-Q2) for controlling the on time based on the polarity of the integration value SI accumulated by the integration means 7, and thus can control the on time of the switching element (MOSFET-Q1 or MOSFET-Q2) supplying a greater amount of the coil current I1 (or I2). Thus, the coil currents I1, I2 flowing in the two windings (primary winding M1 and the secondary winding M2) on the primary side of the pulse transformer T can be balanced with each other.

The drive means 9 includes an amplifier and an output circuit, and generates drive signals SD1, SD2 capable of sufficiently driving (turning on) the MOSFET-Q1 and MOSFET-Q2 based on the drive control signal (PWM signal) supplied from the drive control means 8. The drive signals SD1, SD2 are supplied to the gate G of the MOSFET-Q1 and MOSFET-Q2, respectively.

The current sensor 6 (current transformer (CT) 10) for detecting the coil currents I1, I2, the integration means 7, the drive control means 8, the drive means 9, the MOSFET-Q1 and the MOSFET-Q2 making up the DC magnetic deviation prevention means 3 form a feedback group for performing the feedback control operation until the coil current I1 and the coil current I2 are balanced and the magnetic deviation phenomena are prevented.

As described above, the DC magnetic deviation prevention means 3 according to the invention includes the current sensor 6 for detecting the coil currents I1, I2 flowing in the two windings (primary windings M1, M2) on the primary side of the pulse transformer T, the integration means 7 for integrating the detected coil currents I1, I2 for a predetermined length of time (one period), a drive control means 8 for outputting a drive control signal SC corresponding to the integration value SI accumulated by the integration means 7, and the drive means 9 for outputting the drive signals SD1, SD2 for adjusting the on time of the two switching elements (MOSFET-Q1, MOSFET-Q2) based on the drive control signal SC supplied from the drive control means 8. Thus, based on the detected coil currents nI1, −nI2, a switching element (MOSFET-Q1, MOSFET-Q2) passing a great amount of coil current can be specified, and by adjusting the on time of the switching element thus specified, the coil currents I1, I2 flowing in the two primary windings of the pulse transformer T can be balanced (I1=I2). In this way, the magnetic deviation phenomena attributable to the unbalance between the coil currents can be prevented.

As described above, the electric power conversion device with push-pull circuitry according to the invention comprises a DC magnetic deviation prevention means for detecting the coil currents flowing in the two primary windings of a pulse transformer and balancing the coil currents by adjusting the on time of two switching elements based on the difference between the coil currents, thereby preventing the DC magnetic deviation of the primary windings of the pulse transformer. Therefore, a switching element can be specified by the coil current difference and the polarity of the coil current difference, and the same coil current flowing in the primary and secondary windings can be secured by determining the on time, thereby preventing the DC magnetic deviation of the pulse transformer with a simple configuration.

Also, the DC magnetic prevention means according to the invention includes a current sensor for detecting the coil currents flowing in the two primary windings of a pulse transformer, an integration means for accumulating the detected coil current for a predetermined period of time, a drive control means for outputting a drive control signal corresponding to the integration value accumulated by the integration means, and a drive means for outputting a drive signal for adjusting the on time of the two switching elements based on the drive control signal supplied from the drive control means. Therefore, a switching element for supplying a greater amount of coil current is specified based on the detected coil current, and the coil currents flowing in the two primary windings of the pulse transformer can be balanced by adjusting the on time of the specified switching element, thereby making it possible to prevent the DC magnetic deviation phenomena of the pulse transformer which otherwise might be caused by the unbalanced coil currents.

Further, the current sensor according to the invention detects the coil currents of opposite polarities flowing in the two primary windings of the pulse transformer making up a CT (current transformer). Thus, the difference between the coil currents flowing in the two windings can be detected with a single CT, thereby simplifying the device.

Also, the drive control means according to the invention determines a switching element for controlling the on time based on the polarity of the integration value accumulated by the integration means. Therefore, the on time of the switching element passing a greater amount of the coil current can be controlled, thereby making it possible to balance the coil currents flowing in the two primary windings of the pulse transformer.

Furthermore, the DC power supply according to the invention is composed of a solar cell or a fuel cell. Therefore, the DC power supply used as a distributed power generation unit for the domestic electric appliances can find wider applications, thereby making it possible to improve the convenience of the electric power conversion device.

What is claimed is:

1. An electric power conversion device with push-pull circuitry for turning on/off a DC power supply alternately using two switching elements to convert the DC power to high-frequency pulses, applying the converted high-frequency pulses to two windings on the primary side of a pulse transformer, rectifying and smoothing the high-frequency pulses of different polarities produced from two windings on the secondary side of said pulse transformer to generate a DC current, and converting the DC current thus generated into an AC power supply, said electric power conversion device comprising a DC magnetic deviation prevention means for detecting the coil currents flowing in the two primary windings of said pulse transformer and balancing the coil currents by adjusting the on time of said two switching elements based on the difference between the coil currents to prevent the DC magnetic deviation of the primary windings of said pulse transformer.

2. An electric power conversion device with push-pull circuitry according to claim 1, wherein said DC magnetic deviation prevention means includes a current sensor for detecting the coil currents flowing in said two primary windings of said pulse transformer, an integration means for integrating the detected coil currents for a predetermined period of time, a drive control means for outputting a drive control signal corresponding to the integration value accumulated by said integration means, and a drive means for outputting a drive signal for adjusting the on time of said two switching elements based on the drive control signal supplied from said drive control means.

3. An electric power conversion device with push-pull circuitry according to claim 2, wherein said current sensor makes up a current transformer (CT) for detecting the coil currents flowing in said two primary windings of said pulse transformer in opposite polarities.

4. An electric power conversion device with push-pull circuitry according to claim 2, wherein said drive control means determines a switching element for controlling the on time based on the polarity of the integration value accumulated by said integration means.

5. An electric power conversion device with push-pull circuitry according to claim 1, wherein said DC power supply is selected one of a solar cell and a fuel cell.

* * * * *